United States Patent
Pu et al.

(10) Patent No.: US 8,781,034 B2
(45) Date of Patent: Jul. 15, 2014

(54) METHOD AND MOBILE DEVICE FOR JOINT CELL IDENTITY DETECTION AND CELL MEASUREMENT FOR AN LTE SYSTEM

(71) Applicant: Intel Mobile Communications GmbH, Neubiberg (DE)

(72) Inventors: Tianyan Pu, Dresden (DE); Volker Aue, Dresden (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/676,367

(22) Filed: Nov. 14, 2012

(65) Prior Publication Data
US 2014/0133607 A1    May 15, 2014

(51) Int. Cl.
*H04L 27/06* (2006.01)
(52) U.S. Cl.
USPC ........... 375/340; 375/260; 375/267; 375/347; 375/349
(58) Field of Classification Search
USPC .................... 375/340, 260, 267, 347, 349
See application file for complete search history.

(56) References Cited

U.S. PATENT DOCUMENTS

| 8,320,360 B2 * | 11/2012 | Fukuta et al. | 370/350 |
| 8,406,185 B2 * | 3/2013 | Kim et al. | 370/329 |
| 2008/0285433 A1 * | 11/2008 | Akita et al. | 370/204 |

* cited by examiner

*Primary Examiner* — Kabir A Timory
(74) *Attorney, Agent, or Firm* — Eschweiler & Associates, LLC

(57) ABSTRACT

The present invention relates to a method and system for communication in a mobile device. First and second OFDM symbols containing first and second received cell-specific reference subcarriers, respectively, are received. First and second received cell-specific reference subcarriers of the first and second OFDM symbols are extracted. A pair of received subcarriers is generated by computing the scalar product of the first received cell-specific reference subcarrier and the conjugate of the second received cell-specific reference subcarrier. A reference sequence is provided, that contains pairs of reference subcarriers for multiple, possible combinations of cell-IDs. The pair of received subcarriers is correlated with each pair of reference subcarriers of the reference sequence to generate cell-specific correlation values associated with each cell-ID of a plurality of cell-specific correlation values. The cell-ID of the strongest cell is determined by searching for the highest correlation value.

14 Claims, 5 Drawing Sheets

METHOD AND MOBILE DEVICE FOR JOINT CELL IDENTITY DETECTION AND CELL MEASUREMENT FOR AN LTE SYSTEM

FIELD

The present invention relates to a method and a mobile device for joint cell identity detection and cell measurement for an LTE system.

BACKGROUND

3GPP LTE is a communication standard employing orthogonal frequency division multiplexing (OFDM). Due to its potential for low complexity receiver implementation, OFDM is particularly attractive for high-data rate transmission.

In OFDM, the transmission bandwidth is split into equidistantly spaced orthogonal sub-bands of identical width. Orthogonality is maintained under the prerequisite that the duration of the channel impulse response does not exceed the duration of the guard interval, and if the radio propagation channel conditions vary slowly enough. Both requirements are satisfied by proper selection of system parameters, such as subcarrier spacing and guard interval duration. Then transmission of one data symbol is described by the simple equation $$y_{k,l} = h_{k,l} \cdot x_{k,l} + n_{k,l}.$$

Here x is a transmitted symbol, h is a complex fading coefficient, n is a random noise sample, y is the corresponding received symbol, k is the OFDM subcarrier index, and l is the OFDM symbol index. The noise sample is characterized by the noise variance $\sigma_n^2$. With different values for all different pairs of (k,l), this equation holds for all symbols in the time-frequency plane which is illustrated in FIG. 1. The above holds for a communication scheme with one transmit (Tx) antenna.

An OFDM communication scheme where multiple antennas are used both on the transmit side and the receive side is known as multiple-input multiple-output (MIMO) OFDM. In this case, each element in the time-frequency plane corresponds to the equation $$y_{k,l} = H_{k,l} \cdot x_{k,l} + n_{k,l},$$

where x is a vector of the transmitted symbol, H is a matrix of complex fading coefficients, n is a random noise sample vector, and y is the corresponding received symbol vector. The random noise vector is characterized by its covariance matrix $\Phi_{nn}$.

In a multi-user system, where transmission occurs from one transmitter to multiple receivers, regions in the time-frequency plane may be assigned to different users. The 3GPP LTE standard employs this kind of orthogonal frequency division multiple access (OFDMA) in the downlink, i.e. the transmission direction from a base station to a terminal. In LTE, each element in the time-frequency plane is referred to as a resource element, and the entire time-frequency plane is divided into so-called resource blocks, which are rectangles of 12 subcarriers in the frequency direction times 6 or 7 (depending on the cyclic prefix duration mode) OFDM symbols in the time direction, as illustrated in FIG. 2.

The LTE standard describes a cellular network, where a supplied area is split into cells, each cell being equipped with a base station which serves the mobile stations in that cell; In LTE terminology a base station is referred to as an "evolved Node B" (eNB), and a mobile station or terminal is referred to as user equipment (UE). In LTE, all cells of a network operate at the same center frequency, i.e., the frequency re-use factor is 1, which means that any mobile station will experience interference from neighboring cells in the network. The interference from a neighboring cell depends on the patterns of used and non-used resource blocks in the adjacent cells. Due to processing complexity constraints and limited bandwidth resources, when a network becomes more and more loaded with users, reception at a mobile station turns more and more from a noise limited operation to an interference limited operation. In addition, the communication channel towards an interfering base station is time variant and frequency selective. Thus, when a mobile station receives signals in an LTE network, the composite of noise and interference is generally varying both in time and frequency directions.

Hence, each cell needs to be uniquely identified if a UE wishes to connect to a cell or if a UE is already connected to an LTE cell and wishes to connect to another LTE cell. For this purpose a base station transmits a cell identity (cell-ID) within the Primary Synchronization Signal (PSS) and Secondary Synchronization Signal (SSS). There are 504 unique physical layer cell identities in LTE, grouped into 168 groups of three identities. Three PSS sequences are used to indicate the cell identity within the group and 168 SSS sequences are used to indicate the identity of the group.

In a mobile radio receiver, in order to enable reliable data reception, a number of parameter estimation tasks need to be performed, e.g., time synchronization estimation, frequency synchronization estimation, channel estimation, interference level estimation, Doppler spread estimation, power delay profile estimation, feedback information estimation. PSS detection is used for slot timing detection and physical layer ID detection. SSS detection is used for radio frame detection, cyclic prefix (CP) length detection and TDD/FDD detection. SSS detection is based on coherent demodulation in the frequency domain. This is particularly a problem if a weak cell is superimposed by a strong cell having the same PSS, see FIG. 3. The channel estimate of the weak cell is severely impaired by the strong cell with the same PSS sequence. Averaging over multiple frames and low pass filtering of the channel estimate does not help in this case, since the interference is not white-noise like.

For the purpose of channel estimation reference symbols (subcarriers) are multiplexed into the time-frequency plane of the LTE downlink transmission scheme, such as illustrated in FIG. 4. Reference symbols are data symbols which are known at the receiver and are used for parameter estimation tasks.

FIG. 5 shows a state-of-the art architecture for determining the receive power of the received reference symbols. The received reference symbols are extracted either in the time domain 51 or in the frequency domain 54. In case the received reference symbols are extracted in the time domain, fine frequency correction and combining 52 is performed, and the received reference symbols are transformed to the frequency domain with a FFT 53. After frequency domain reference subcarrier (symbol) extraction 54, the received reference symbols are demodulated 56 and correlated with a sequence of reference symbols known at the receiver by computing the scalar product 45. For the purpose of noise elimination an averaging 57 can be done over a plurality of sub-frames.

All reference subcarriers are QPSK modulated for the purpose of keeping the peak to average power ratio of the transmitted waveform low. The reference signal sequence, provided in 3GPP Technical Specification 36.211 "Physical Channels and Modulation" (Release 8) can be written as:

$$r_{l,n_s} = \frac{1}{\sqrt{2}}(1 - 2c(2m)) + j\frac{1}{\sqrt{2}}(1 - 2c(2m+1))$$

where $n_s$ is the slot number with a radio frame and l is the OFDM symbol number within the slot. The pseudo random sequence c(i) is comprised of a length-31 Gold sequence, given in section 7.2 of the technical specification. The scrambling sequence generator shall be initialized with $c_{init}=2^{10}(7*(n_s+1)+l+1)(2*N_{cell-ID}+1)+2*N_{cell-ID}+N_{CP}$ at the start of each frame, wherein $N_{cp}$ is 1 for normal CP and 0 for extended CP.

Hence, the reference signal sequence also carries unambiguously one of the 504 different cell identities $N_{cell-id}$ as well as the CP mode. Cell-specific reference signals (CRSs) are transmitted on all downlink subframes in a cell supporting non-MBSFN transmission. Cell-specific reference signals are transmitted on one or several of antenna ports 0 to 3.

In order to perform handover, a UE normally needs to detect the neighboring cell first and then measure their reference subcarrier receiver power (RSRP). The faster the cell search and measurement can finish, the lower is the call drop rate a user will experience. So it is crucial to reduce cell detection time and cell measurement as much as possible.

SUMMARY

It is therefore a task of the present invention to provide a method for cell identification in a LTE system having an improved performance compared to pure SSS cell identification. It is specifically a task of the present invention to provide a method for joint cell identity detection and cell measurement of the reference subcarrier receive power for an LTE system.

A method for joint cell identity detection and cell measurement in an E-UTRA/LTE UE mobile device and related mobile device is disclosed, using a cell specific reference subcarrier to detect a cell-ID based on blindly calculating a reference subcarrier receive power (RSRP) over all possible cell-ID candidates, substantially as shown in and/or described in connection with at least one of the figures.

These and other advantages, aspects and novel features of the present invention, as well as details of an illustrated embodiment thereof, will be more fully understood from the following description and drawings.

BRIEF DESCRIPTION OF THE DRAWINGS

Reference will be made to the accompanying drawings, wherein.

DETAILED DESCRIPTION

Due to cell interference the received signals of M cells overlap each other on same cell-specific reference signal (CRS) resource element $R_{j,l,f}$ $$R_{j,l,f} = \sum_{m=0}^{M-1} H_{m,j,l,f} G_{m,j,l}$$

m is the cell index, j is the CRS subcarrier index in the frequency grid, l is the CRS OFDM symbol index within one radio frame, f is the radio frame index. H is the channel response and G is the transmitted CRS reference subcarriers.

One embodiment of a method and a mobile device for jointly detecting a cell-ID and a reference subcarrier receive power is described with reference to FIGS. 6a-6b and 7.

Figure 1:
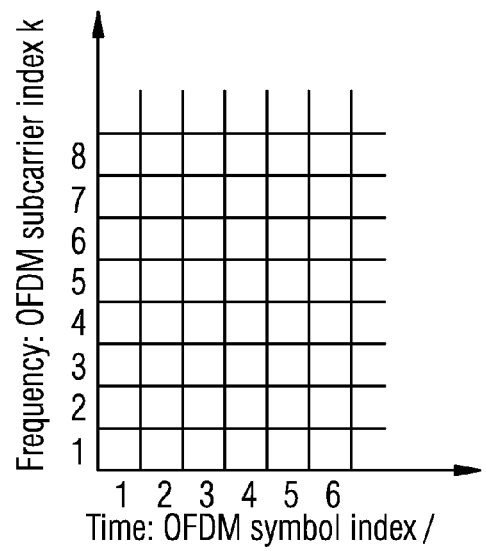
FIG. 1 illustrates a time-frequency plane used in OFDM to define symbols.
Figure 2:
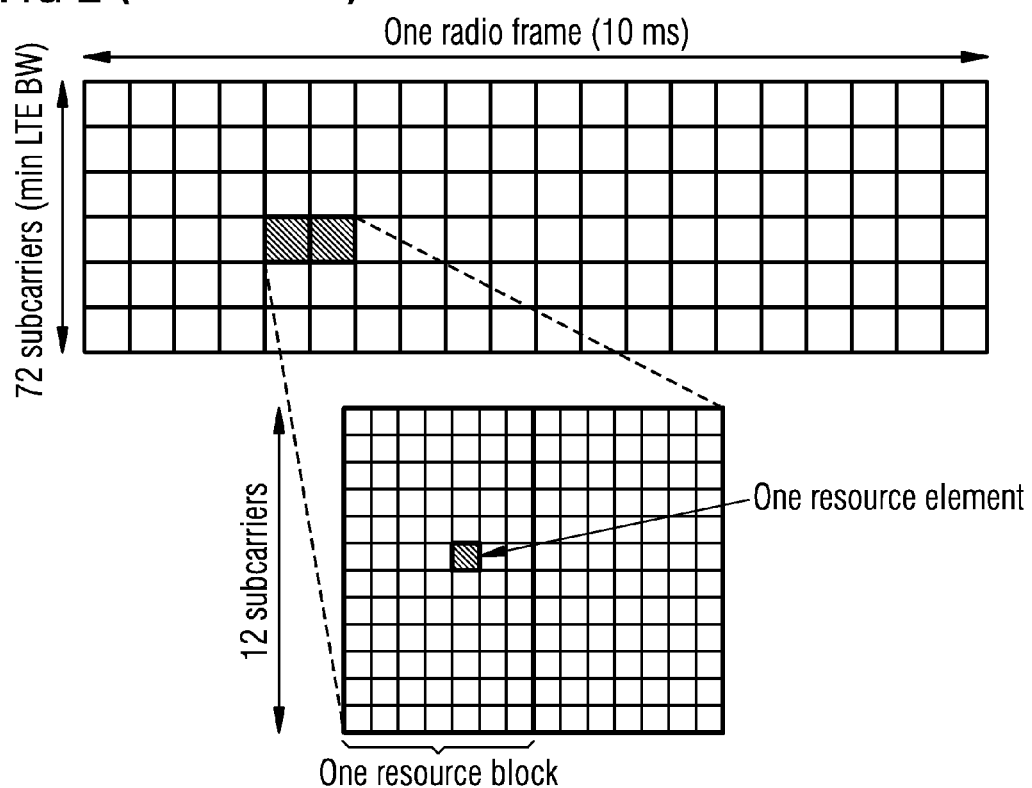
FIG. 2 shows an LTE time-frequency grid.
Figure 3:
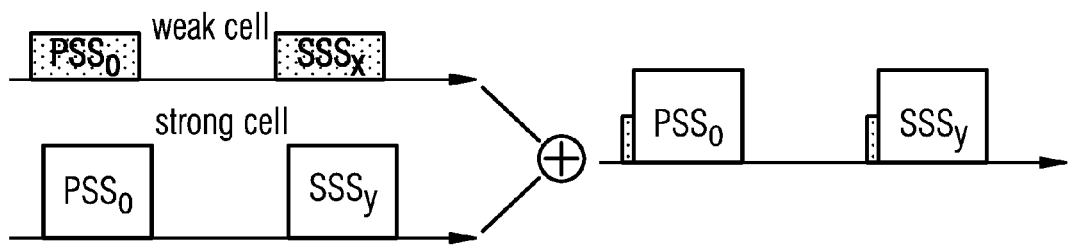
FIG. 3 illustrates a superposition of a strong LTE cell and a weak LTE cell.
Figure 4:
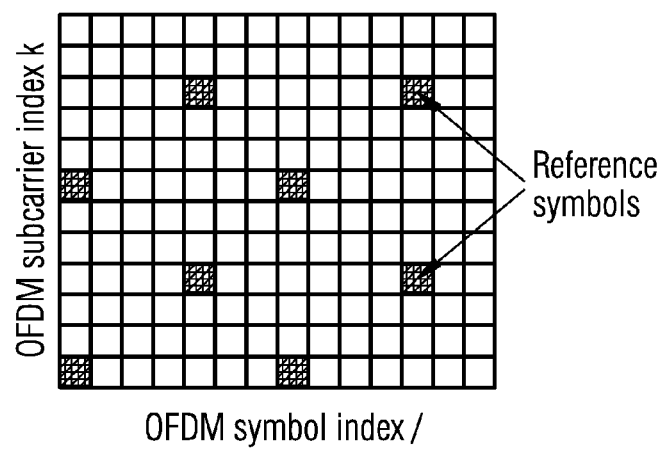
FIG. 4 illustrates an example for positioning reference symbols in the time-frequency plane of FIG. 1.
Figure 5:
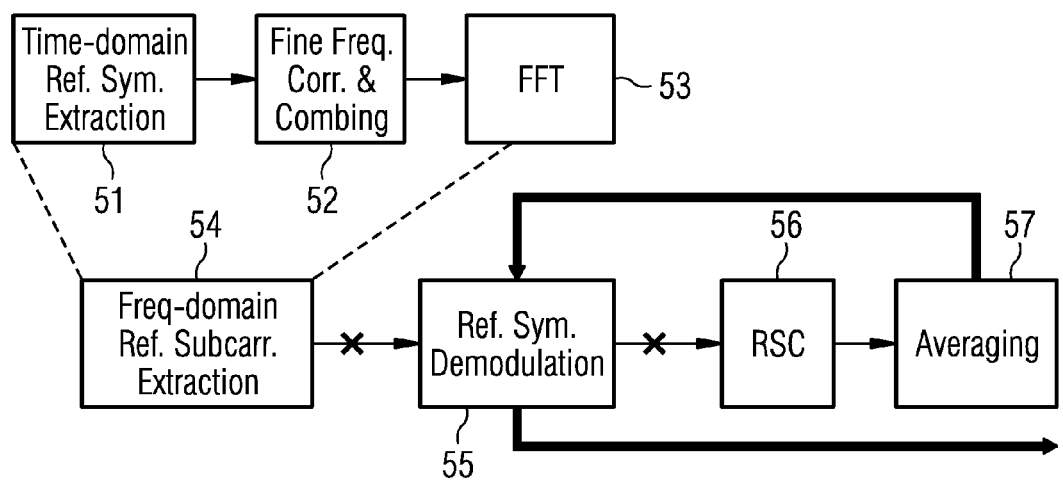
FIG. 5 shows a state of the art reference subcarrier receive power detection architecture of a mobile device.
Figure 6:
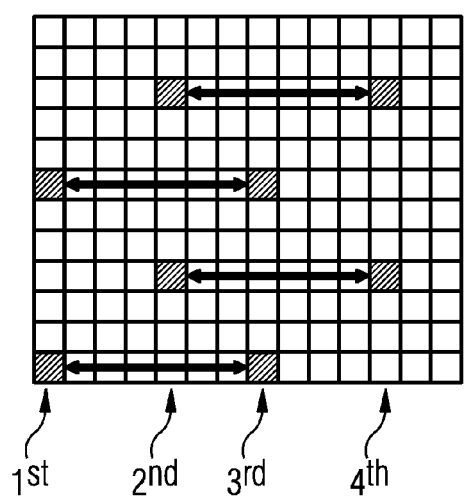
FIGS. 6a and 6b show two options for pairing cell-specific reference subcarriers.
Figure 6:
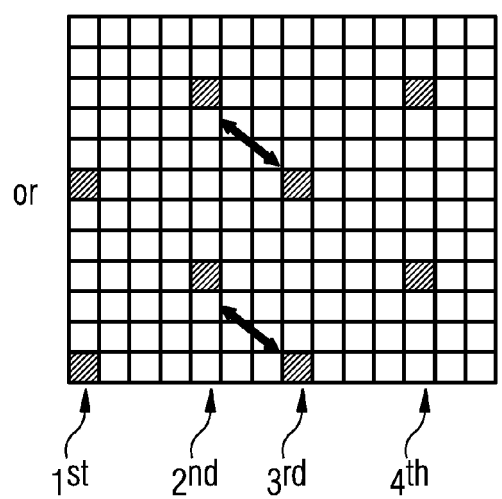
Figure 7:
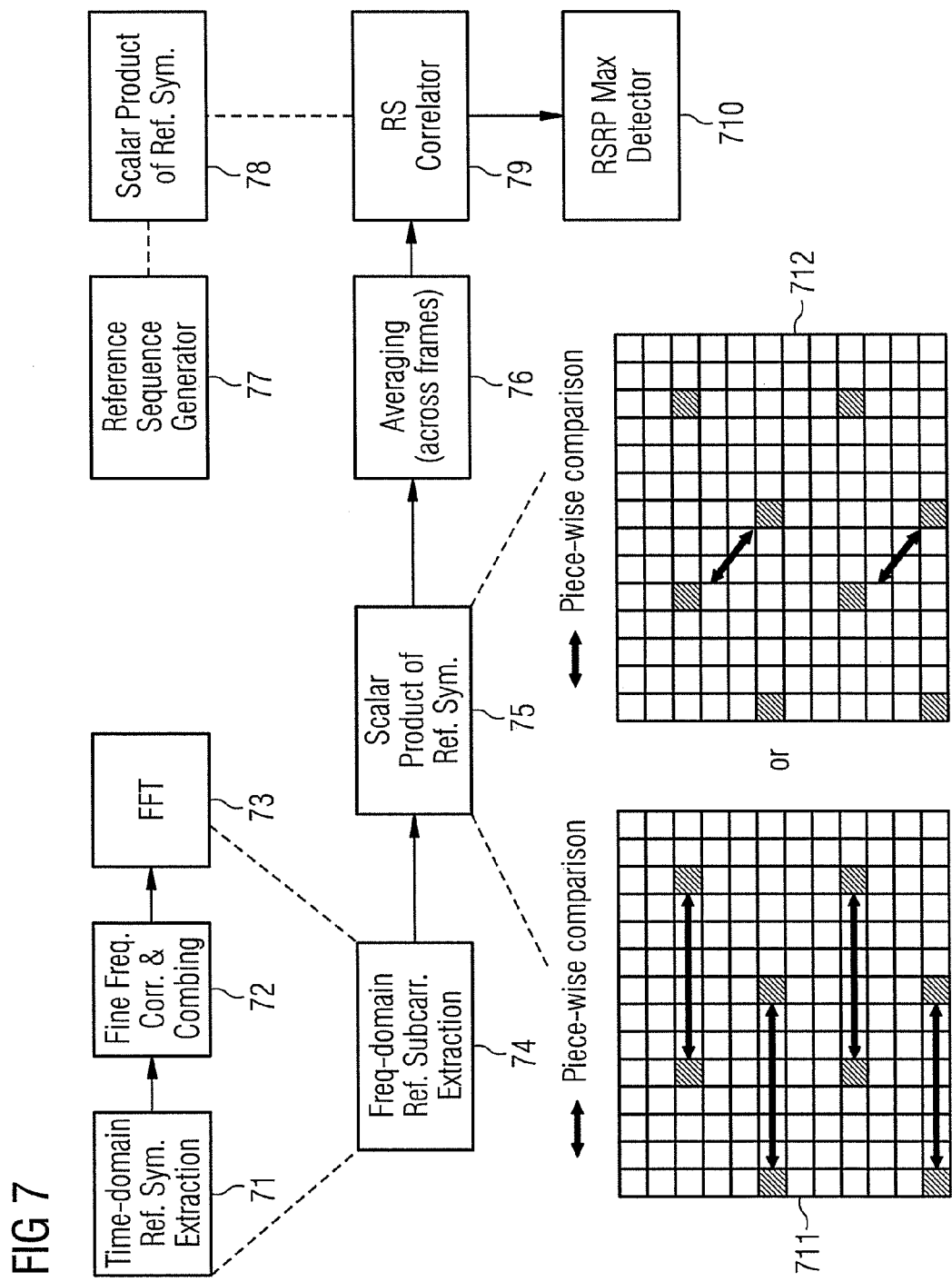
FIG. 7 shows an architecture of a mobile device for jointly detecting a cell-ID and a reference subcarrier receive power.

A first OFDM symbol u containing a first received cell-specific reference subcarrier $R_{j,u,f}$ is received and the received $R_{j,u,f}$ is extracted in module 74 of FIG. 7. A second OFDM symbol v containing a second received cell-specific reference subcarrier $R_{j,v,f}$ is received and the received $R_{j,v,f}$ is also extracted in module 74. The two OFDM symbols are paired in a way as shown in FIGS. 6a-6b and again in FIG. 7, sub-FIGS. 711 and 712. Any two CRS OFDM symbols can be paired as long as they are not too far away from one another on the time axis. If they are not too far away the channel response $H_{m,j,u,f}$ and $H_{m,j,v,f}$ will be nearly equal. FIG. 6a shows a pairing of CRS OFDM symbols that are 6 OFDM symbols apart with aligned cell-specific reference subcarriers on the time axis. Due to the alignment, the pairing shown in FIG. 6a is advantageous in a multi-path environment. FIG. 6b shows a pair of two adjacent CRS OFDM symbols that are 3 OFDM symbols apart. Due to its short distance on the time axis, this pairing is advantageous if the Doppler spread is high.

Supposing the $u^{th}$ and the $v^{th}$ symbol inside one radio frame becomes a pair denoted as the $k^{th}$ pair, the pair of received subcarriers is computed in module 75 according to $$D_{j,k,f} = R_{j,u,f} * R^*_{j,v,f}$$

where $R^*_{j,v,f}$ is the conjugate of the receive signal $R_{j,v,f}$.

For the sake of noise reduction the scalar product can be averaged across F radio frames according to $$D_{j,k} = \sum_{f=0}^{F-1} D_{j,k,f} jF \text{ in module 75.}$$

The CRS reference subcarriers are locally generated in module 77 and a pair of a reference sequence containing pairs of CRS reference subcarriers is generated according to $$L_{m,j,k} = G_{m,j,u} * G^*_{m,j,v}$$

for all possible combinations of cell-IDs. The reference sequence may be provided by brute force evaluation or a white list.

In case the length of the cyclic prefix also needs to be detected blindly, then the scalar product is computed for all possible combinations of cell-IDs and CP in module 78.

The pair of received subcarriers $D_{j,k,f}$ is correlated with each pair of reference subcarriers $L_{m,j,k}$ of the reference sequence for generating a cell-specific correlation value associated with each cell-ID of a plurality of cell-specific correlation values.

The RS correlator, module 79, correlates a pair of received subcarriers with a pair of reference subcarriers for cell-ID m according to:

$$COR_m = \sum_{j=0}^{J-1}\sum_{k=0}^{K-1} D_{j,k} * L^*_{m,j,k}/(J*K)$$

wherein $L^*_{m,j,k}$ is complex conjugate of $L_{m,j,k}$. Thus, a cell-specific correlation value associated with each cell-ID of a plurality of cell-specific correlation values is generated.

By pairing two CRS OFDM symbols a sequence of pairs of received subcarriers may be generated, see FIG. 6. In this case the output of the RS correlator 79 may be summed together over the frequency axis and/or time axis to obtain a single correlation value associated with each cell-ID.

The cell-ID of the strongest cell is determined by searching for the highest correlation value within the plurality of cell-specific correlation values and assigning the cell-ID associated with the highest correlation value to the cell-ID of the strongest cell. This is done in the RSRP maximum value detector, module 710.

The cell-specific correlation value is the RSRP value as the output of the correlator, module 79, is:

$$COR_i =$$
$$\sum_{j=0}^{J-1} G^*_{i,j,0} G^*_{i,j,0} \sum_{f=0}^{F-1} \left(\left(\sum_{m=0}^{M-1} H_{m,j,0,f} G_{m,j,0} + n_{j,0,f}\right) \times \right.$$
$$\left.\left(\sum_{m'=0}^{M-1} H^*_{m',j,1,f} G^*_{m',j,1} + n_{j,1,f}\right)\right)$$
$$COR_i \approx \sum_{j=0}^{J-1} R^*_{i,i,j} R_{i,i,j} H^2_{i,j} + \sum_{m=0,m\neq i}^{M-1}\sum_{j=0}^{J-1} R^*_{i,i,j} R_{m,m,j} H^2_{m,j} +$$
$$\sum_{m=0}^{M-1}\sum_{m'=0,m'\neq m}^{M-1} INT_{i,m,m'} + NOS$$

The first term is the wanted one. The second and third term is cross-cell interference. The fourth term is noise related and can be reduced by averaging a long time and frequency. The second and third term are small compared to the first term.

In a further embodiment the plurality of cell-specific correlation values is sorted in a descending manner. On the plurality of cell-specific correlation values an interference cancellation is performed for determining the cell-IDs of the remaining interfering cells.

Specifically, for a pre-defined number N of highest correlation values $\overline{COR_i}$ a successive interference cancellation is performed, starting with the highest correlation value $\overline{COR_0}=COR_0$, according to:

$$\overline{COR_i} = COR_i - \sum_{m=0}^{i-1} \overline{COR_m} RCC_{i,m}\ i = 1 \ldots N-1;$$

wherein $RCC_{i,m}$ is the cross correlation between cell-specific reference subcarrier i and cell-specific reference subcarrier m.

On the remaining correlation values an interference cancellation may then be performed according to:

$$\overline{COR_i} = COR_i - \sum_{m=0}^{N-1} \overline{COR_m} RCC_{i,m}\ i = N \ldots M\ 1,$$

wherein M is the maximum number of cell-specific correlation values.

Figure 8:
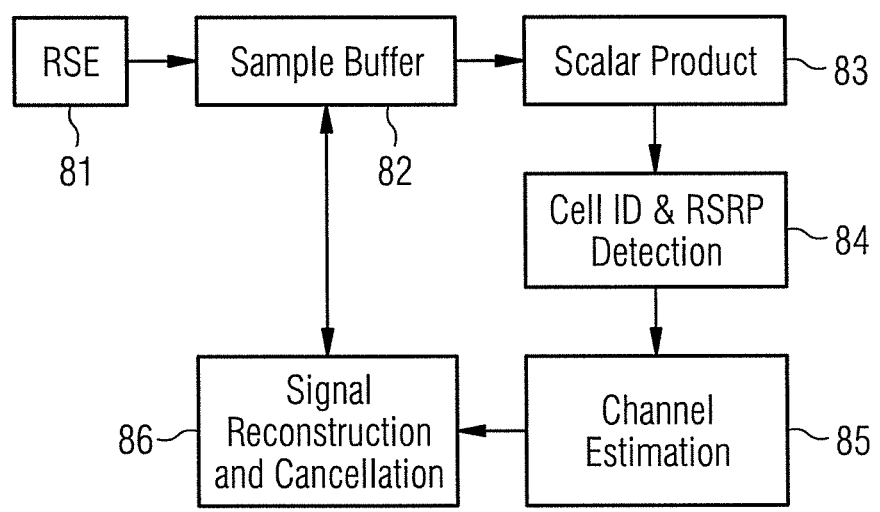
FIG. 8 shows an architecture for jointly detecting a cell-ID and a reference subcarrier receive power employing successive interference cancellation by performing channel estimation and signal reconstruction and estimation.

In yet another embodiment a successive interference cancellation on the received CRS subcarriers is performed as shown in FIG. 8. The reference subcarrier extraction module (RSE) 81 is preceded by a sample buffer 82. The received CRS subcarriers are paired by computing their scalar product in the scalar product module 83. Cell ID and RSRP detection is performed in module 84. With the RSRP values the channel response is estimated in module 85. In module 86 the transmitted CRS data symbols are reconstructed with the knowledge of the channel response from module 85 and cancelled from the received CRS subcarrier stored in the sample buffer 82.

The method may be further improved, at a higher computation cost, by pairing more than two CRS OFDM symbols.

It is an advantage of the present invention that handover performance is improved in terms of the time required.

It is another advantage of the present invention that computation complexity is reduced while still maintaining a high sensitivity.

While the present invention has been described in reference to certain embodiments, it will be understood by those skilled in the art that various changes may be made and equivalents may substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a mobile device:
receiving a first OFDM symbol containing a first received cell-specific reference subcarrier;
extracting the first received cell-specific reference subcarrier of the first OFDM symbol;
receiving a second OFDM symbol containing a second received cell-specific reference subcarrier;
extracting the second received cell-specific reference subcarrier of the second OFDM symbol;
generating a pair of received subcarriers by computing a scalar product of the first received cell-specific reference subcarrier and a conjugate of the second received cell-specific reference subcarrier;
providing a reference sequence, the reference sequence containing pairs of reference subcarriers for multiple combinations of cell-IDs, wherein a pair of reference subcarriers is a scalar product of a first cell-specific reference subcarrier and the conjugate of a second cell-specific reference subcarrier at a same resource element in a time-frequency grid as the first and second received cell-specific subcarriers respectively;

correlating the pair of received subcarriers with each pair of reference subcarriers of the reference sequence to generate a cell-specific correlation value associated with each cell-ID of a plurality of cell-specific correlation values; and determining the cell-ID of a strongest cell by searching for a highest correlation value within the plurality of cell-specific correlation values and assigning the cell-ID associated with the highest correlation value to the cell-ID of the strongest cell.

2. The method according to claim 1, wherein a sequence of pairs of received subcarriers is generated for a specific number of a plurality of cell-specific reference subcarriers contained within the first and the second OFDM symbol, wherein a correlation value associated with each cell-ID is generated for each of the pairs of received subcarriers within the sequence, and wherein a single correlation value associated with each cell-ID of the plurality of cell-specific correlation values is generated by summing up the correlation values of each of the pairs of received subcarriers over a frequency axis of the LTE time-frequency grid.

3. The method according to claim 2, wherein a single correlation value associated with each cell-ID of the plurality of cell-specific correlation values is generated by summing up the correlation value of each of the pairs of received subcarriers over a time axis and frequency axis.

4. The method according to claim 1, wherein the reference sequence contains pairs of reference subcarriers for all possible combination of cell-IDs and length of cyclic prefix.

5. The method according to claim 1, wherein the first OFDM symbol and the second OFDM symbol are three or six OFDM symbols apart from one another on the LTE time-frequency grid.

6. The method according to claim 1, wherein the pair of received subcarriers is generated by computing the scalar product of two cell-specific reference subcarriers of a same frequency bin or an adjacent frequency bin of the LTE time-frequency grid.

7. The method according to claim 1, wherein generating a pair of received subcarriers involves averaging the scalar product over a plurality of radio frames.

8. The method according to claim 1, wherein the plurality of cell-specific correlation values is sorted in a descending manner, and on the plurality of cell-specific correlation values an interference cancellation is performed for determining the cell-IDs of remaining interfering cells.

9. The method according to claim 8, wherein on a predefined number N of highest correlation values $\overline{COR}_i$ a successive interference cancellation is performed, starting with the highest correlation value $\overline{COR}_0 = COR_0$, according to:

$$\overline{COR}_i = COR_i - \sum_{m=0}^{i-1} \overline{COR}_m RCC_{i,m} \quad i = 1 \ldots N-1;$$

wherein $RCC_{i,m}$ is a cross correlation between cell-specific reference subcarrier i and cell-specific reference subcarrier m.

10. The method according to claim 9, wherein on the remaining N ... M−1 correlation values an interference cancellation is performed according to:

$$\overline{COR}_i = COR_i - \sum_{m=0}^{N-1} \overline{COR}_m RCC_{i,m} \quad i = N \ldots M-1$$

wherein M is the maximum number of cell-specific correlation values of the plurality of cell-specific correlation values.

11. The method according to claim 1, wherein the reference sequence is provided by brute force evaluation or a while list.

12. The method according to claim 1, wherein at least two further OFDM symbols are used for generating pairs of received cell-specific reference subcarriers.

13. The method according to claim 1, wherein a channel estimation is performed using the plurality of cell-specific correlation values, and wherein a transmitted symbol is reconstructed and cancelled from the received cell-specific reference subcarriers.

14. A mobile device comprising means for receiving a first OFDM symbol containing a first received cell-specific reference subcarrier;

means for extracting the first received cell-specific reference subcarrier of the first OFDM symbol;

means for receiving a second OFDM symbol containing a second received cell-specific reference subcarrier;

means for extracting the second received cell-specific reference subcarrier of the second OFDM symbol;

means for generating a pair of received subcarriers by computing a scalar product of the first received cell-specific reference subcarrier and a conjugate of the second received cell-specific reference subcarrier;

means for providing a reference sequence, the reference sequence containing pairs of reference subcarriers for multiple combinations of cell-IDs and length of cyclic prefix, wherein a pair of reference subcarriers is a scalar product of a first cell-specific reference subcarrier and the conjugate of a second cell-specific reference subcarrier;

means for correlating the pair of received subcarriers with each pair of reference subcarriers of the reference sequence to generate a plurality of cell-specific correlation values; and means for determining the cell-ID of a strongest cell by searching for a highest correlation value within the plurality of cell-specific correlation values and assigning the cell-ID associated with the highest correlation value to the cell-ID of the strongest cell.

* * * * *